No. 854,270. PATENTED MAY 21, 1907.
W. H. CARRIER.
METHOD OF HEATING AND HUMIDIFYING AIR.
APPLICATION FILED JULY 16, 1906.

2 SHEETS—SHEET 1.

Witnesses:
E. A. Volk.
A. G. Dimond.

Inventor
Willis H. Carrier
by
Wilhelm, Parker & Hard
Attorneys.

No. 854,270. PATENTED MAY 21, 1907.
W. H. CARRIER.
METHOD OF HEATING AND HUMIDIFYING AIR.
APPLICATION FILED JULY 16, 1906.
2 SHEETS—SHEET 2.
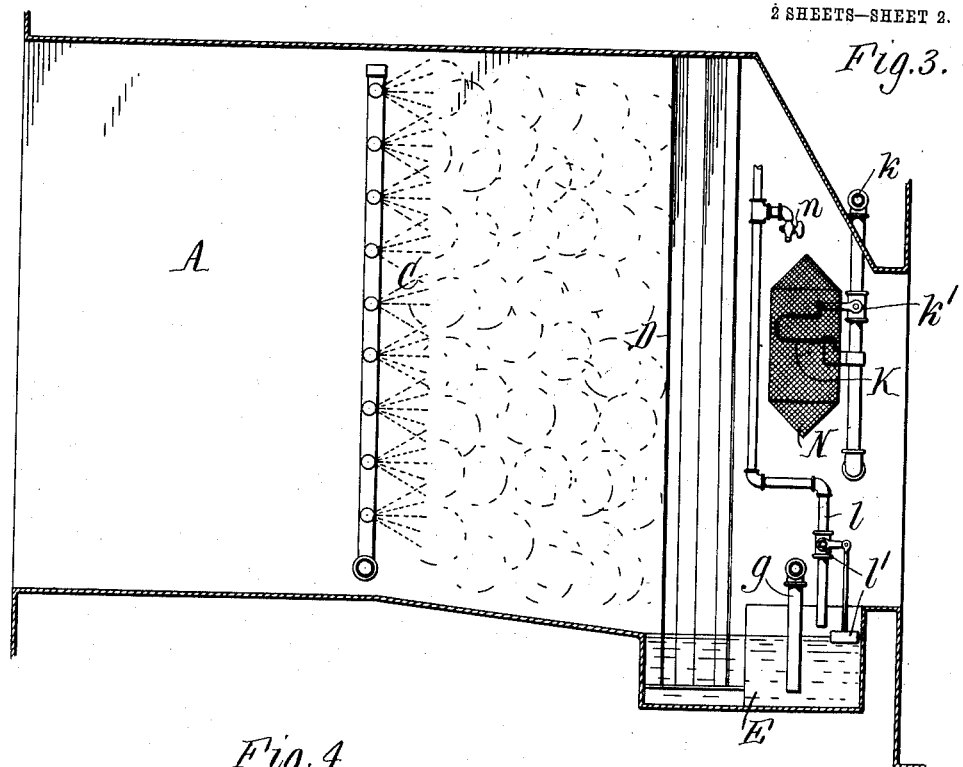
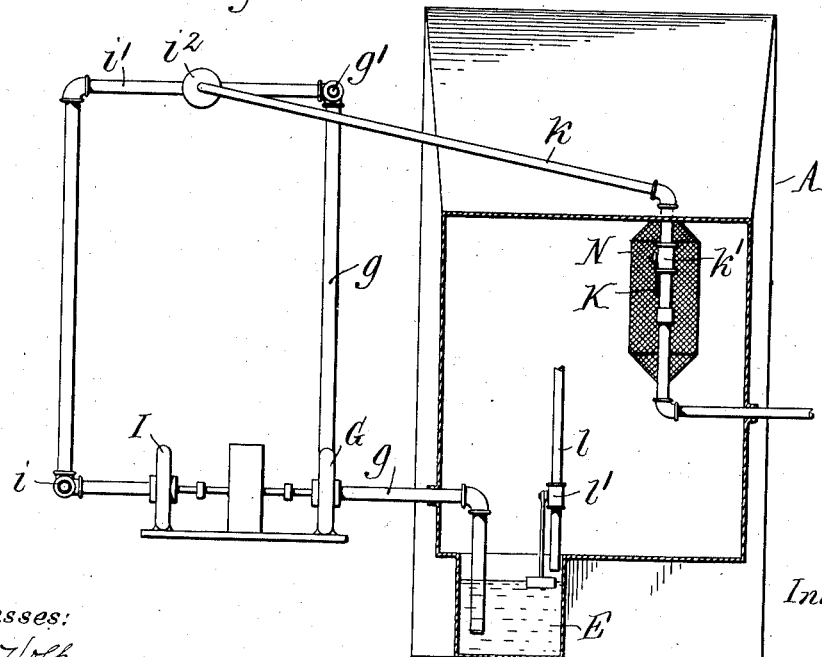
Witnesses:
E. A. Volk.
A. F. Dimond.
Inventor.
Willis H. Carrier
by
Wilhelm, Parker & Hart Attorneys.

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

METHOD OF HEATING AND HUMIDIFYING AIR.

No. 854,270.         Specification of Letters Patent.         Patented May 21, 1907.

Application filed July 16, 1906. Serial No. 326,328.

*To all whom it may concern:*

Be it known that I, WILLIS H. CARRIER, a citizen of the United States, residing at Buffalo, in the county of Erie and State of New York, have invented a new and useful Improvement in Methods of Heating and Humidifying Air, of which the following is a specification.

This invention relates to a method of automatically regulating the humidity and temperature of air for heating and ventilating purposes, the invention being especially useful for supplying fresh air of a definite absolute humidity in textile mills where it is necessary for the health of the employees, and to insure a high grade product, to keep the temperature and humidity within prescribed limits.

The object of the invention is to automatically regulate the temperature and humidity of the air regardless of external atmospheric conditions within limits, in an economical and practical manner, and without use of direct radiation, by introducing into the air, water at properly regulated temperatures below the boiling point.

Figure 1:
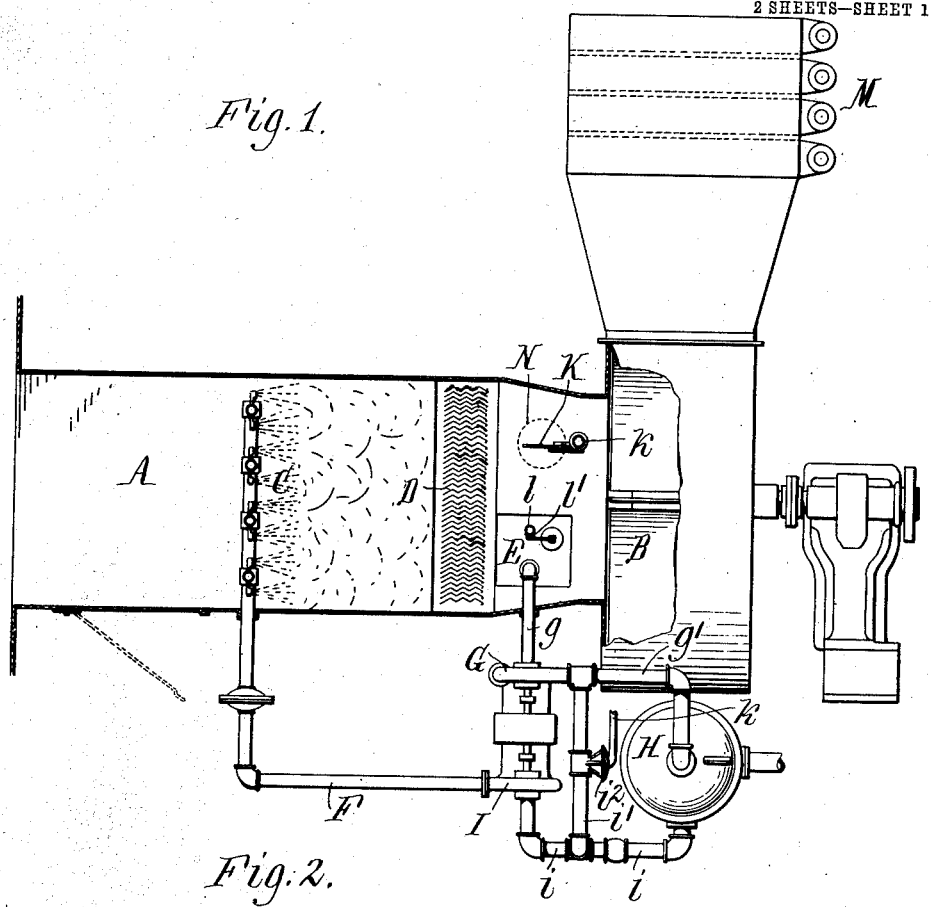
Figure 2:
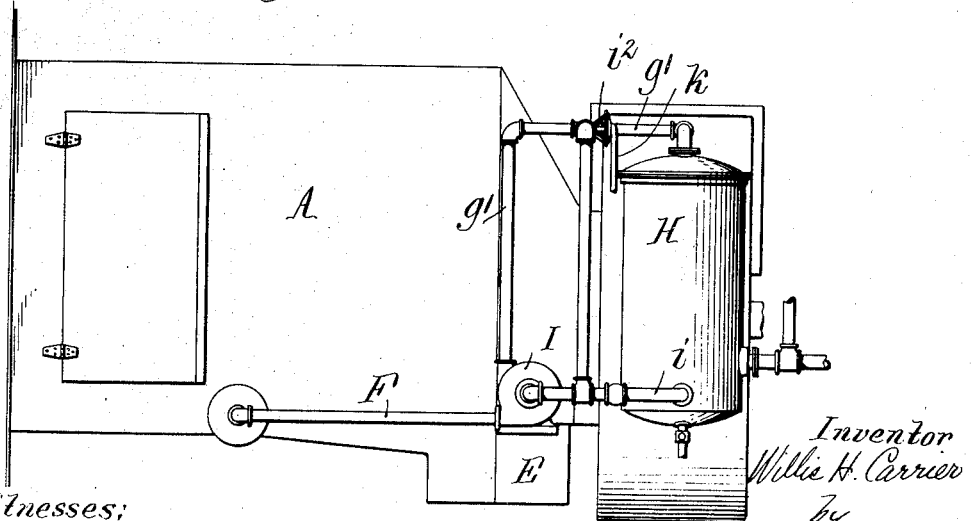

In the accompanying drawings, consisting of two sheets: Figure 1 is a sectional plan view of an apparatus adapted for carrying out the method embodying the invention. Fig. 2 is a fragmentary side elevation thereof. Fig. 3 is a fragmentary sectional elevation thereof, on an enlarged scale. Fig. 4 is a sectional elevation, on an enlarged scale, of the thermostatic devices.

Like letters of reference refer to like parts in the several figures.

In carrying out the method forming the subject matter of this invention, warm or hot water at a temperature above that of the air and below the boiling point is intimately mixed with a current of air, preferably by discharging the water into the air in a very fine spray or mist. The water raises the temperature of the air which will therefore vaporize and assimilate an amount of the water depending upon the rise in temperature of the air so that its humidity is increased. A thermostat subject to the influence of the heated and humidified air controls means in the water supply system, whereby the water is maintained at the proper temperature to raise the temperature of the air to the degree required for the air to become saturated with an amount of vapor sufficient to give the desired absolute humidity to the air when raised to the temperature at which it is to be utilized. The free water is separated from the air current and is preferably collected, reheated and returned in the form of spray to the air, the same water with such additional amount as is necessary to maintain a constant volume of water being thus repeatedly circulated and used. Incidentally the air is thoroughly washed and cleansed, as the water sprayed into the air collects the solid particles of dust and foreign matter, which adhere to the free particles of water and are separated with the latter from the air.

The method will be more fully explained in connection with the operation of the apparatus for performing the same. The apparatus employed for carrying out this method is preferably constructed as follows: A represents a trunk or chamber through which a current of external air is caused to pass by a suitable fan or other propelling device B. Within the trunk or chamber A is located a battery of spray nozzles C of any suitable sort adapted to fill the trunk or chamber with a fine spray or mist of water, so that all portions of the air in passing through the trunk or chamber will come into intimate contact with the water. D represents a separator of any suitable sort adapted to remove the free particles of water from the vapor and water ladened air. This separator preferably, though not necessarily, is of the kind disclosed in Letters Patent granted to me January 2, 1906, No. 808,897, and consists of a series of spaced zig-zag upright baffle plates against which the air impinges as it passes between them. The free particles of water collect on and run down the baffle plates and flow into a collecting well or receptacle E at the bottom of the air trunk or chamber. F represents a water supply pipe leading from a source of supply to the spray nozzles. Preferably the same water is repeatedly used, being pumped from the well E in the air trunk and returned to the spray nozzles after being heated. For this purpose a pump G is shown, having a suction pipe $g$ entering the well E. The discharge pipe $g'$ of this pump leads to a water heating device H, which may be a feed water heater or any other means for raising the temperature of the water. Another pump I has a suction or intake pipe $i$ leading from the water heater H and this pump is connected to the supply pipe F and furnishes the water to the spray nozzles. A by-pass pipe $i'$ connects the pipes $g'$ and $i$ leading to and from the water heater to enable a part or all of the water to pass by the heater without being heated. A thermostatic valve $i^2$ of any suitable sort is provided in the by-pass pipe $i'$ and this valve is controlled by a thermostat K located within the air trunk or chamber A, where it will be influenced by the warmed and humidified air after passing the separator. In the construction shown, which is well known, the thermostatic valve $i^2$ is operated by compressed air from a pipe $k$ and the air pressure is controlled by a valve $k'$ in such pipe actuated by the thermostat K. The thermostat is expanded or contracted by changes of temperature in the air surrounding it and through the medium of the compressed air shifts the thermostatic valve $i^2$ to allow a greater or less volume of water to pass around the heater through the by-pass pipe $i'$, thereby regulating the temperature of the water. Sufficient water is supplied to the well E by a pipe $l$ controlled by a float-operated valve $l'$, Figs. 3—4, to make up for the water vaporized and maintain a constant volume in the circulating system. The water circulating or supply and heating devices and the thermostatic devices for controlling the temperature of the water above described are intended only to give a proper understanding of the apparatus and any other suitable means for these purposes could be employed.

The operation of the apparatus is as follows: The thermostatic controlling devices are adjusted to keep the water at the temperature necessary to heat the external air to a predetermined temperature, and if the temperature of the external air rises or falls they will automatically decrease or increase the temperature of the water sufficiently to maintain the air in the air-trunk or chamber after passing the separator practically at such predetermined temperature. An illustration of the operation of the apparatus is afforded by the following example: Let it be required to maintain seventy-five per cent. saturation with a room temperature of 70° F. This requires that the air in the room shall contain approximately six grains of moisture per cubic foot, and to secure this the air must be saturated at about 61°, as this is the maximum weight of water which will be assimilated or vaporized by the air at this temperature. The thermostat is therefore set or adjusted so that the water will be sprayed into the air at a temperature high enough to raise the temperature of the air as nearly as possible to 61°, and the air being in intimate contact with the fine spray or mist of water will vaporize or assimilate this maximum quantity of moisture. The temperature of the water will be raised or lowered as required, by fluctuations in the temperature of the external atmosphere, to bring the temperature of the air in the trunk or chamber A up to 61°. The temperature of the humidified air can then be raised as required, to give a predetermined desired temperature in the room, by a heating device M, Fig. 1, of any usual or suitable form, or by discharging the air into a room heated sufficiently by other means to cause the necessary rise in temperature of the air. The relative humidity of the air will depend upon the temperature given to it after being humidified, and to increase or decrease the humidity the thermostat is adjusted to saturate the air at higher or lower temperatures. The absolute humidity of the air can thus, by the proper adjustment of the thermostat, be regulated as desired. The apparatus is more particularly adapted for operation when the temperature of the external atmosphere is below 63° F. but it will also operate with reasonable certainty at somewhat higher temperatures, for instance, up to 70° F., more or less.

In order to render the thermostat more responsive at temperatures above 63° F. it is preferably inclosed by a perforated or wire gauze screen N, Fig. 3, covered with muslin or analogous moisture-absorbing fabric which is kept moist in any suitable way, for instance, by a regulated quantity of water which flows thereon from a drip cock $n$. The thermostat is thus always enveloped by a moist atmosphere instead of being acted upon directly by the more or less dry air in the trunk or chamber and it will then correspond more nearly to the web bulb of a hygrometer. This is desirable in treating air at the higher temperatures as then the hot water spray does not so greatly vary the temperature of the air and consequently will not so readily saturate it with vapor.

It will be understood that a large volume of water is intimately mixed with the air and the water is never heated to the boiling point.

I claim as my invention:

1. The herein described method of humidifying air, consisting in causing an intimate contact of the air with water heated to a temperature above that of the air and below the boiling point, and automatically regulating the temperature of the water to maintain a practically constant temperature of the air, substantially as set forth.

2. The herein described method of heating air, consisting in spraying into the air water heated to a temperature above that of the air and below the boiling point, and automatically varying the temperature of the water to maintain a practically constant temperature of the air by means controlled by the temperature of the air, substantially as set forth.

3. The herein described method of heating and humidifying air, consisting in causing an intimate contact of the air with water heated to a temperature above that of the air and below the boiling point, and automatically varying the temperature of the water to maintain a practically constant temperature of the air by means controlled by the temperature of the air, substantially as set forth.

4. The herein described method of regulating the absolute humidity of air, consisting in spraying into the air water heated to a temperature above that of the air and below the boiling point, and regulating the temperature of the water by means controlled by the temperature of the humidified air, substantially as set forth.

5. The herein described method of regulating the absolute humidity of air, consisting in spraying into the air water heated to a temperature above that of the air and below the boiling point, separating the free water from the air and regulating the temperature of the water by means controlled by the temperature of the humidified air, substantially as set forth.

6. The herein described method of regulating the absolute humidity of air, consisting in spraying into the air water heated to a temperature above that of the air and below the boiling point, separating the free water from the air and regulating the temperature of the water by a thermostatic device influenced by the humidified air, substantially as set forth.

7. The herein described method of regulating the relative humidity of air, consisting in saturating the air with vapor by causing an intimate contact of the air with water heated to a temperature above that of the air and below the boiling point, regulating the temperature of the water by a thermostatic device influenced by the humidified air, and then changing the temperature of the air, substantially as set forth.

8. The herein described method of regulating the absolute humidity of air, consisting in spraying into the air water heated to a temperature above that of the air and below the boiling point, and regulating the temperature of the water by a thermostatic device enveloped by moisture and influenced by the humidified air, substantially as set forth.

Witness my hand, this sixth day of July, 1906.

WILLIS H. CARRIER.

Witnesses:
F. W. GOTTSCHALK,
WM. L. FOX.